United States Patent [19]
Okoshi

[11] 4,130,337
[45] Dec. 19, 1978

[54] HOLOGRAPHIC VIEWER SYSTEM

[76] Inventor: Takanori Okoshi, No. 7-7, 3-chome, Sengoku, Bunkyo-ku, Tokyo, Japan

[21] Appl. No.: 841,719

[22] Filed: Oct. 13, 1977

Related U.S. Application Data

[63] Continuation of Ser. No. 760,024, Jan. 17, 1977, abandoned, which is a continuation of Ser. No. 553,086, Feb. 26, 1975, abandoned, which is a continuation of Ser. No. 412,643, Nov. 5, 1973, abandoned, which is a continuation of Ser. No. 134,177, Apr. 15, 1971, abandoned.

[30] Foreign Application Priority Data

Apr. 21, 1970 [JP] Japan .................................. 45-33634
Dec. 30, 1970 [JP] Japan ................................ 45-122855

[51] Int. Cl.² .............................................. G03H 1/30
[52] U.S. Cl. ................................ 350/3.76; 350/3.79; 350/3.86
[58] Field of Search .................................... 350/3.5, 128

[56] References Cited

U.S. PATENT DOCUMENTS

| | | | |
|---|---|---|---|
| 3,180,214 | 4/1965 | Fox | 350/128 |
| 3,515,452 | 6/1970 | Pole | 350/3.5 |
| 3,567,305 | 3/1971 | Collier et al. | 350/3.5 |
| 3,580,655 | 5/1971 | Leith et al. | 350/3.5 |
| 3,608,993 | 9/1971 | DeBitetto | 350/3.5 |
| 3,625,584 | 12/1971 | St. John | 350/3.5 |

OTHER PUBLICATIONS

Ives, *Jour. of the Optical Society of America*, vol. 21, 1931, pp. 109–118.
Burckhardt et al., *Applied Optics*, vol. 7, No. 3, Apr. 1968, pp. 627–631.
Lohmann, *IBM Technical Disclosure Bulletin*, vol. 10, No. 10, Mar. 1968, pp. 1452–1454.
McCrickerd et al., *Applied Physics Letters*, vol. 12, No. 1, Jan. 1968, pp. 10–12.

*Primary Examiner*—Ronald J. Stern
*Attorney, Agent, or Firm*—Toren, McGeady and Stanger

[57] ABSTRACT

In the system disclosed, a hologram diffracts a portion of a reconstruction beam into an image-carrying beam which is projected onto a screen. The hologram is substantially flat and one dimension along the flat of the hologram is smaller than the flat dimension orthogonal thereto. Along the direction parallel to the larger dimension the screen is shaped to convert the image of the image-carrying beam orthoscopically along that direction. The screen includes means for diffusing the light of the beam in a direction parallel to the smaller dimension.

23 Claims, 14 Drawing Figures

HOLOGRAPHIC VIEWER SYSTEM

This is a continuation of application Ser. No. 760,024 filed Jan. 17, 1977, which in turn is a continuation of application Ser. No. 553,086 filed Feb. 26, 1975, which in turn is a continuation of application Ser. No. 412,643 filed Nov. 5, 1973, which in turn is a continuation of application Ser. No. 134,177 filed Apr. 15, 1971 all now abandoned.

BACKGROUND OF INVENTION

This invention relates to halograms and particularly to methods and means for viewing holographic images.

SUMMARY OF THE INVENTION

According a feature of the invention, a strip shaped hologram is viewed over a large viewing space by projecting its image upon a screen which is autocollimating in the elongated direction of the hologram and which spreads the light incident thereon in the direction transverse to the strip length.

DESCRIPTION OF THE PREFERRED EMBODIMENTS

Figure 1:
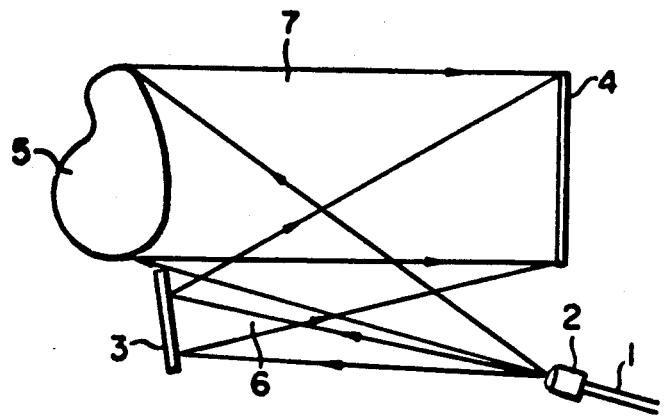
FIG. 1 is an explanatory sketch showing the method of forming a hologram.

In FIG. 1, a coherent laser beam 1 is directed by a microscope objective lens 2 toward a reflector 3, which reflects the beam and forms a reference beam 6 that strikes a hologram or hologram plate 4. Light from the objective lens 2 also strikes an object 5 whose reflection forms a signal beam 7. The signal beam 7 and the reference beam 6 form interference patterns which are recorded on the hologram 4.

Figure 2:
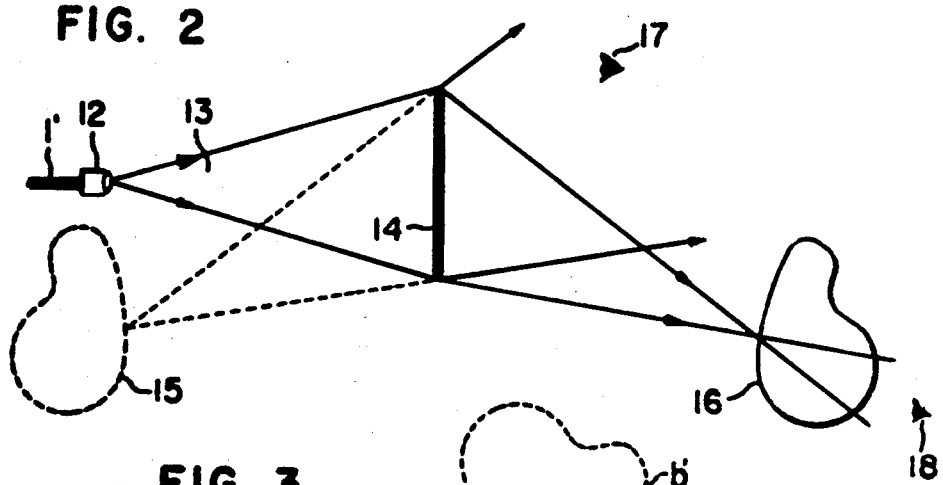
FIG. 2 is an explanatory sketch showing the method of reproducing an image from a hologram by way of an example.

When a hologram formed by the foregoing process is illuminated by the reference beam, the latter reconstructs the original object wave. This reproduces three-dimensional images of the object. FIG. 2 illustrates the principle of reconstructing the object wave with the hologram. Here, coherent radiation 11 passes through an objective lens 12 of a microscope to produce a reconstructing beam that illuminates a hologram 14. The illumination reconstructs a three-dimensional virtual image 15 and a three-dimensional real image 16.

Such three-dimensional images reproduced from a hologram as mentioned above are generally classified into two kinds, that is, the virtual image and the real image. The viewer observes the virtual image at the position 17. When the viewer's eye is located at the point 18, the viewer observes a real image 16. However, this image is a pseudoscopic three-dimensional image. The pseudoscopic three-dimensional image can be converted into an orthoscopic three-dimensional image by projecting the incident beam onto an auto-collimating screen (for example, a cat's-eye lens screen, a cubic corner screen or the like) which is adapted to cause the incident beam to turn back to its initial direction.

Figure 3:
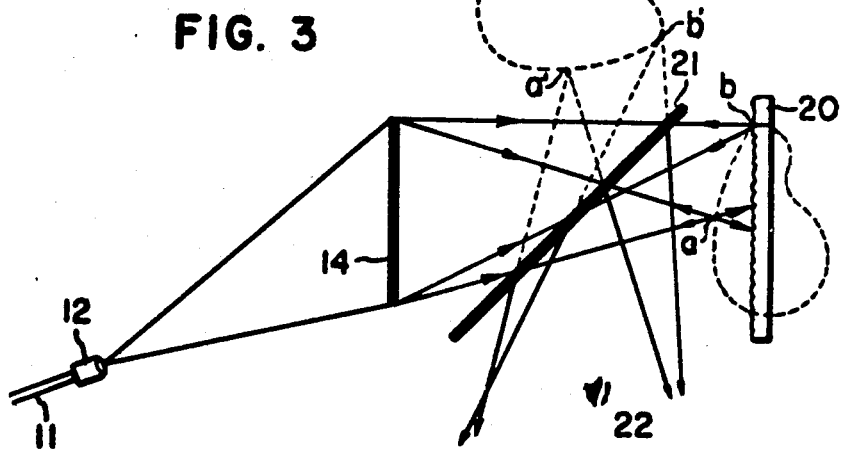
FIGS. 3 and 4 are explanatory sketches respectively of the above method by way of another example.

FIG. 3 illustrates the foregoing principle. Here, a real image is formed at an autocollimating screen 20 through a half or translucent mirror 21, back to the translucent mirror 21 and to a viewer 22. The autocollimating screen 20 returns light emerging from the point a formed on the contour of the reconstructed real image and reflects it back through the point a toward the translucent mirror 21. The latter reflects the light from the point a so that a viewer observes the virtual image a' in the mirror 21. The viewer also observes the point b as b'. Accordingly, the relative positions of the points on the object as viewed by the viewer are reversed. Thus the viewer observes a correct stereographic image.

As is described hereinbefore, a hologram records the wave front of the object so that all the information concerning the object are recorded on any small fraction of the hologram.

Figure 4:
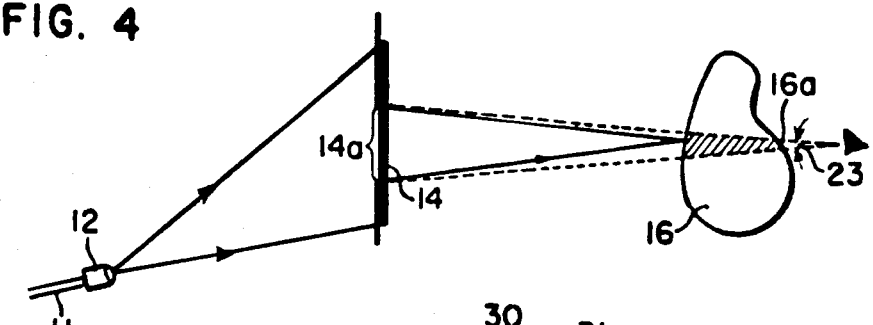

Consequently as shown in FIG. 4, when the hologram is illuminated at any fraction 14a thereof for the reproduction, the object 16 will naturally be reproduced. However, in this case, the viewer can observe only the portion 16a of the object 16 disposed within the angle 23 from his eye 3. The latter sees the fraction 14a on the hologram 14. Other parts of a hologram cannot be observed unless the eye 3 of the viewer is moved to another position.

From the standpoint of the foregoing theory, a larger hologram is desirable. However, the larger the hologram, the larger the amount of information, and thus the width of zone required for transmission is vast.

An object of the present invention is to solve the above-mentioned two problems which are not compatible with each other, and to provide a method of simultaneous observation of the whole range of the image reproduced from miniaturized hologram having lesser quantitities of informations.

Figure 5:
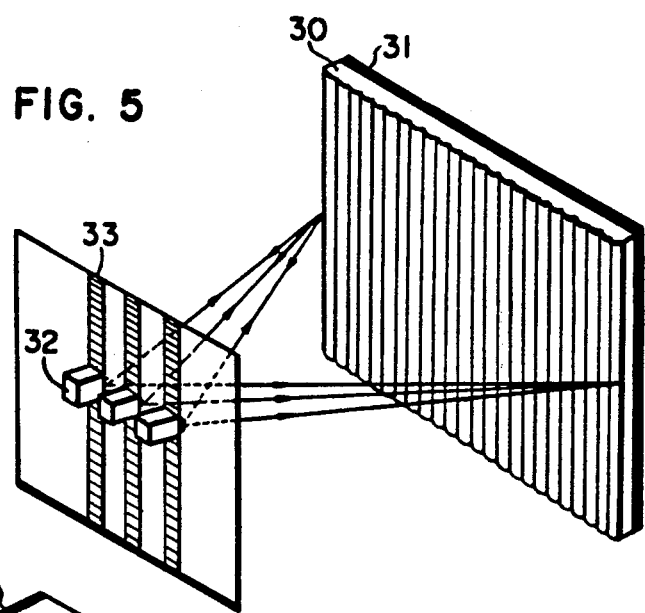
FIG. 5 is an explanatory sketch of a lenticular screen to be applied in the present invention.
Figure 6:
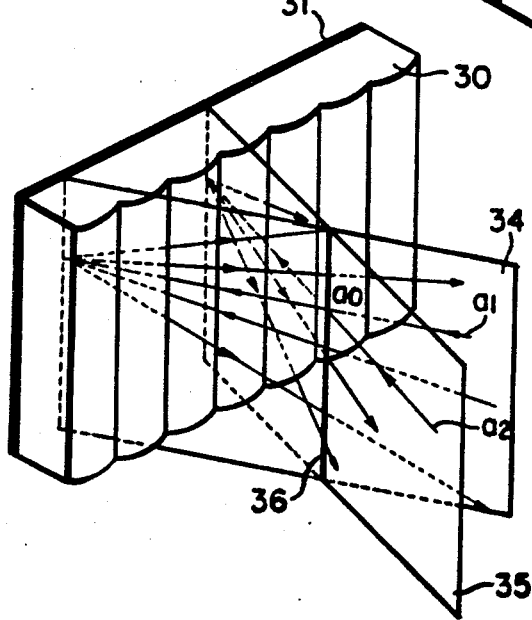
FIG. 6 is an enlarged view of the above screen shown in FIG. 5.
Figure 7:
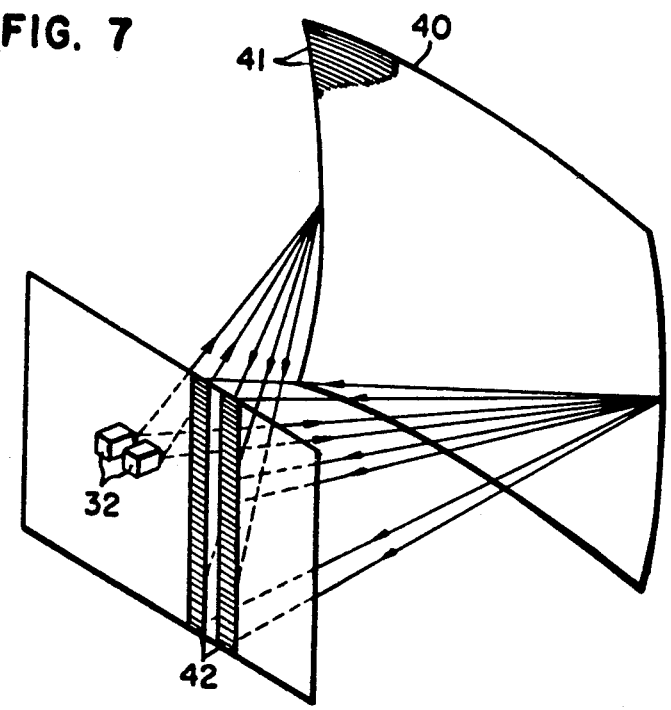
FIG. 7 is an explanatory sketch of a displaceable condensing point type limited directional screen to be applied in the present invention.

FIGS. 5, 6 and 7 respectively show examples of a limited directional screens to be applied in the present invention. FIGS. 5 and 6 show respective lenticular screens comprising a multiplicity of fine cylindrical lenticular lenses 30 provided with a diffusion reflection plane 31 on the rear surface of the focal point of the lenses 30.

As shown in the drawings, the light from the projector 32 is incident upon the lenticular lenses 30. Because the focal distance of each is short, the incident beam may be considered to be composed of almost parallel rays. Accordingly the lenticular lenses will form a linear image on the diffusion reflection plane disposed at the focal plane. The linear image, when it is diffused and reflected, will proceed horizontally in the direction inverse to the incident direction and turn back to its initial direction. Thus the lenticular screen furnishes directivity to turn the incident beam back to its initial direction. However, in the longitudinal direction which has no curvature on the cylindrical lenticular lenses, i.e. the vertical direction, the beam is only diffused and reflected without any directivity in the diffuse reflection plane. Thus each beam returning to the projector will be diffused in one direction over a long strip-shaped zone 33, 33, . . . When the real image (pseudoscopic three-dimensional image) reproduced from a hologram is projected on the screen having the characteristics mentioned above, a correct, i.e. orthoscopic, stereographic image is observed, and moreover the beam is diffused in one direction. For instance, as shown in FIG. 6, taking one point $a_o$ of the projected real image into consideration, and watching two beams of light $a_1$, $a_2$ which form the image at the point $a_o$, it can be understood that the reflected beam after encountering the lenticular screen 30 is diffused over the planes 34 and 35 respectively including the generating line of the incident beam and the lenticular lenses. Thus the image on said point $a_o$ is formed along the intersecting line 36 of the plane 34 and 35. There a pseudoscopic three-dimensional image is converted into an orthoscopic three-dimensional image having the identical but opposite relationship to the position shown in FIG. 3.

FIG. 7 shows a displaceable condensing point type limited directional screen formed of a large concave mirror (or a large parabolic mirror) 40 and irregular fine parallel grooves 41 extending laterally.

The light beams from the projector 32 are condensed on the screen 40 by the image producing action of the screen. At the same time the light beams are diffused in the direction perpendicular to the grooves so as to cover fine strip-shaped zones 42, 42 having a width equivalent to that of the projector lenses.

In other words, the light beam from the projector 32 has directivity imparted thereto only in one direction and is diffused in the direction perpendicular to one direction. This feature is similar to that of the lenticular screen shown in FIG. 5, but different from the latter in respect of the condensing point displaceable from the position of the projector.

Figure 8:
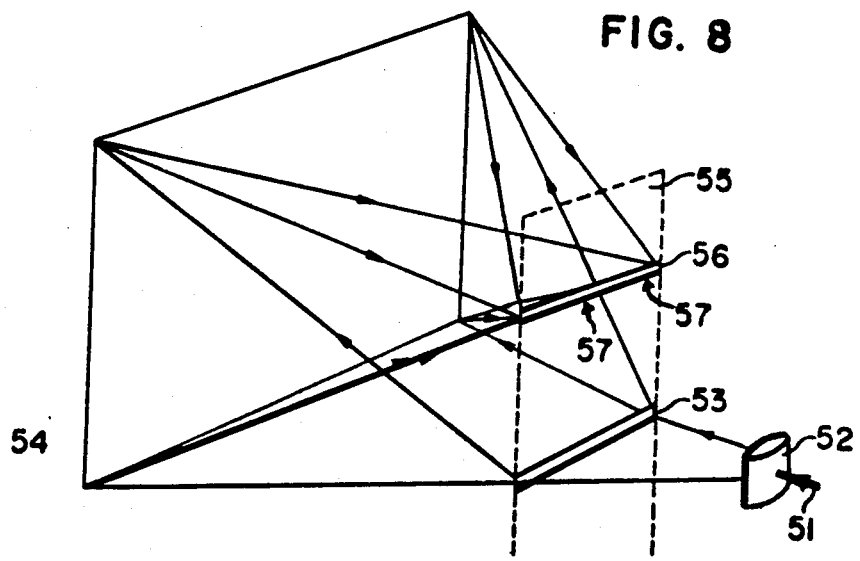
FIG. 8 is a perspective view showing an outline of the present inventive system in a form of an embodiment.

These embodiments utilize only two examples of the limited directional screens having unidirectional selectivity and diffusivity in the direction perpendicular thereto. Many similar screens exist. FIG. 8 shows an embodiment according to the present invention wherein the reference numeral 51 designates the coherent beam, 52 is a cylindrical lens for illuminating a hologram, 53 is a strip-shaped hologram extending along the direction of the viewer's eye. Member 54 is a limited directional screen, 55 is the plane on which the reproduced image is observed, 56 is a specific portion of the plane 55, and 57 is the viewer. The pseudoscopic three-dimensional image reproduced from the strip-shaped hologram 53 is converted into the orthoscopic three-dimensional image on the limited directional screen 54 having such characteristics such as shown in FIGS. 5 and 7. At this time, the viewer can observe three-dimensional image reproduced on an extensive plane 55 parallel to the screen containing the hologram because of diffusivity in one direction. (In this case, the area of the lateral direction is decided according to the length of a hologram.) The resulting configuration is similar to the image formed with a multitude of identical strip-shaped holograms arranged in parallel with one another in the longitudinal direction. This eliminates the disadvantage of fragmental observation of the object as shown in FIG. 4 and permits simultaneous observation of the whole area of the object. Another advantage lies in that the viewer does not feel that he is observing the object through a window in spite of the object being formed by arranging a multitude of identical strip-shaped holograms in parallel with one another.

The above has been explained relative to the projection of a hologram. The same is applicable for projecting a holographic stereogram, composed of picture elements corresponding to parallax variations caused by two eyes facing one direction, photographed by an ordinary camera from the different view points, and a one-dimensional integral photograph taken through fly-eye-lens which is composed of a multitude of micro lenses in one-dimensional arrangement.

Furthermore, a holography stereographic movie picture is possible by successively projecting the strip-shaped holograms formed according to variations by time, or holographic stereograms or one-dimensional integral photography.

Figure 9:
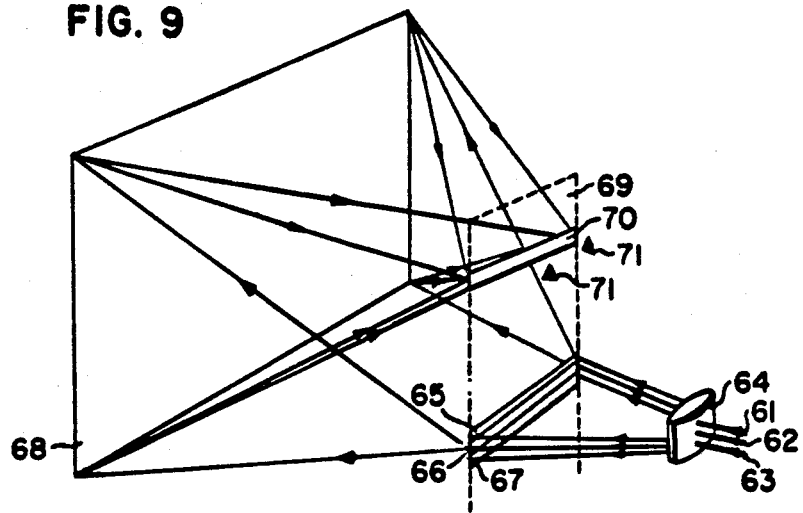
FIG. 9 is a perspective view showing the other embodiment of an outline of the above system shown in FIG. 8.

FIG. 9 illustrates an embodiment of the present invention for reproducing a three-dimensional color image. Here, respective coherent radiations 61, 62, and 63, correspond to the three primary colors, e.g., in the form of a red beam 61, a green beam 62, and a blue beam 63. A cylindrical lens 64 uses the respective beams 61, 62, and 63, to illuminate three strip-shaped holograms 65, 66, and 67, respectively recorded with images corresponding to the three primary color beams. A limited directional screen 68 receives the light passing through the holograms 65, 66, and 67. The reconstructed image is observed in a plane 69. A viewer 71 is located at a specific portion 70 of the plane 69. Thus, in the foregoing embodiment, if the strip-shaped holograms are recorded so as to form respective images of three primary colors, and are each illuminated with one of the primary colors, the viewer observes a color image.

The real image reproduced from a hologram or integral photography according to the present invention as hereinbefore elucidated is characterized in that said image has a unidirectional selectivity while it is projected onto a limited directional screen which diffuses light in the direction perpendicular to said unidirectional selectivity. This makes it advantageous to observe an extensive field of vision such as landscape within the plane broader than the observation area. The latter is determined by the dimension of a hologram. The viewer is able to observe the whole area of the real image at one time even when an angle of the viewer's eye to a hologram is smaller than an angle for the real image reproduced from a hologram as in the case of the embodiment shown in FIG. 8.

According to the present invention, stereographic movie pictures can be produced from a hologram as in the embodiment shown in FIG. 8 and also a three-dimensional color image can be reproduced on the screen as is the case of the embodiment shown in FIG. 9.

Figure 10:
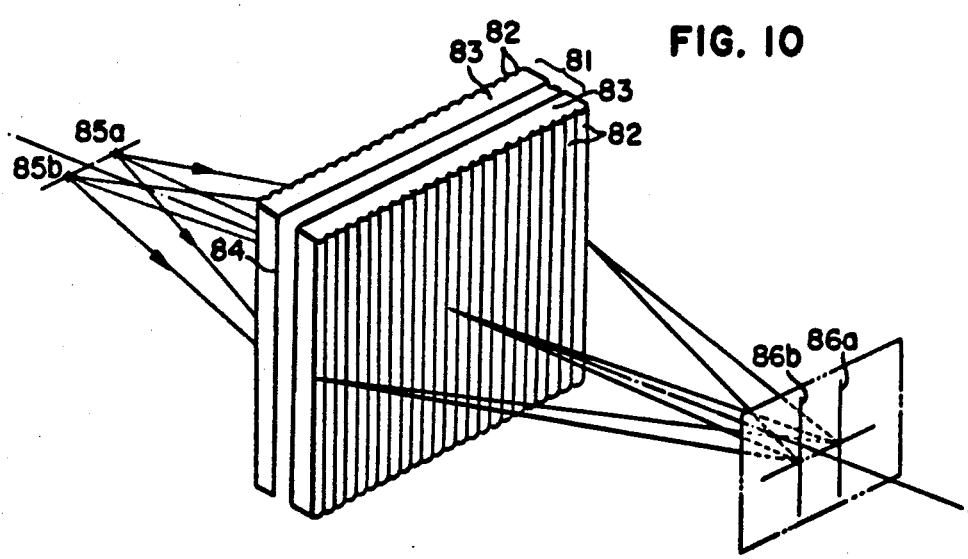
FIG. 10 is a perspective view showing an outline of a permeability type limited directional screen and the like to be applied in the present invention.
Figure 11:
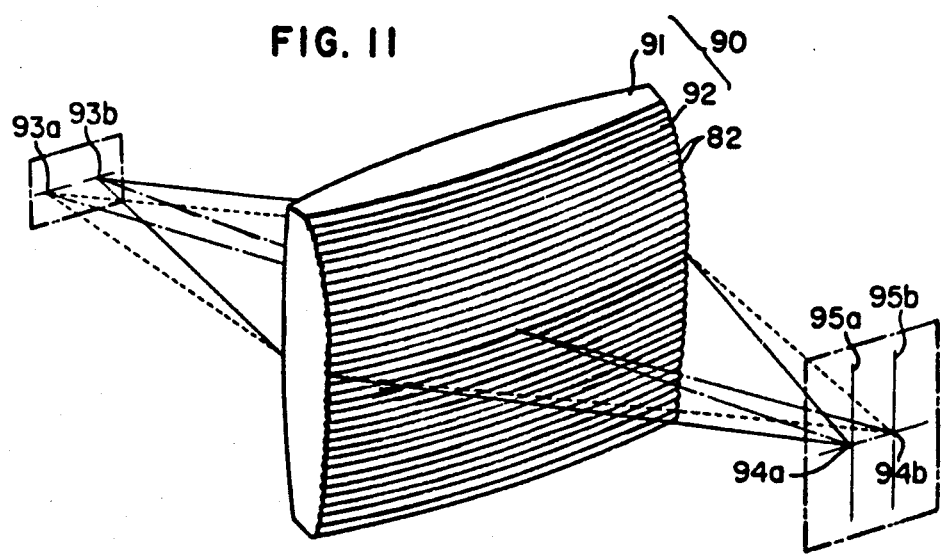
FIG. 11 is a perspective view of the above screen shown in FIG. 10 in a form of the other embodiment.

FIGS. 10 and 11 show embodiments of transmission type limited directional screens respectively. In FIG. 10 a transmission type lenticular screen 81 includes two oppositely disposed lenticular plates 83 and 83, each of which is formed with a multitude of fine cylindrical lenticular lenses 82, 82, ... and a diffusion transmitting plane 84 interpositioned between the two plates 83, 83. The beams from point sources of light 85a, 85b respectively as shown in FIG. 10 are incident upon the lenticular lenses 82 and the incident beam may be considered to be composed of parallel rays for the most part, since the focal distance of the lenses are very short. Accordingly, the lenticular lenses produce a linear image on the diffusion transmitting plane located at the focal plane focused on infinity. Thus the linear image is diffused and transmitted. One part of said image proceeds toward a symmetrical position to the point source of light with reference to the diffusion plane. All lenticular lenses act in a similar manner to that described above, so that all beams from the point sources of light are transmitted through the screen. Subsequently they are condensed on the position symmetrical to the point source of lights (such as described hereinbefore and called directivity). However, this can be said only in the direction in which the cylindrical lenticular lenses refract. In the other direction in which the said lenses do not refract, that is, in the longitudinal or vertical direction, projected beams are diffused at the diffusion transmitting plane and have no directivity. Consequently condensed beams expand along the longitudinally long linear portions 86a, 86b. This is another embodiment of a limited directional screen.

Figure 12:
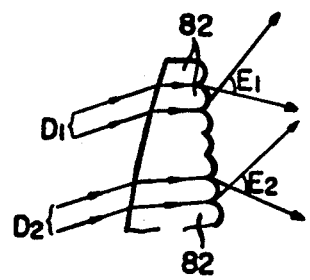
FIG. 12 is a perspective view of an essential parts of the screen shown in FIG. 11 in an enlarged scale.

FIG. 11 shows a transmission type limited directional screen 90 composed of a large lens 91 and lenticular lens array 92 (in this sketch the large lens 91 is shown to be integral with the lens array 92). Here fine cylindrical lenticular lenses 82, 82 constituting the lens array 92 are arranged in the horizontal plane as shown. In case the lenticular lens array 92 is not provided therewith, the large aperture lens 91 will act to condense divergent beams from the points 93a, 93b respectively to the conjugate positions 94a, 94b (that is, they have directivity). However, on the other hand, when the lenticular lens array 92 is provided on the screen, the beam $D_1$ from one of the lenticular lenses 82, as shown in FIG. 12, will proceed in the direction $E_1$ after a single refraction and will be diffused, while the beam $D_2$ from the other lens 82 is diffused in the direction $E_2$. Accordingly, the beams from the points 93a, 93b are condensed in the form of straight lines 95a, 95b (that is, by the limited directional screen).

Two different examples of transmission type limited directional screens have been described. The transmission type limited directional screen herein is one which has unidirectional diffusibility and also has diffusibility in the direction perpendicular to the unidirectional diffusibility. In other words, this type of screen transmits the beam from the point source of light through the screen and then condenses the beam in the form of straight line or similar to a line. Many such screens are available other than the above examples.

Figure 13:
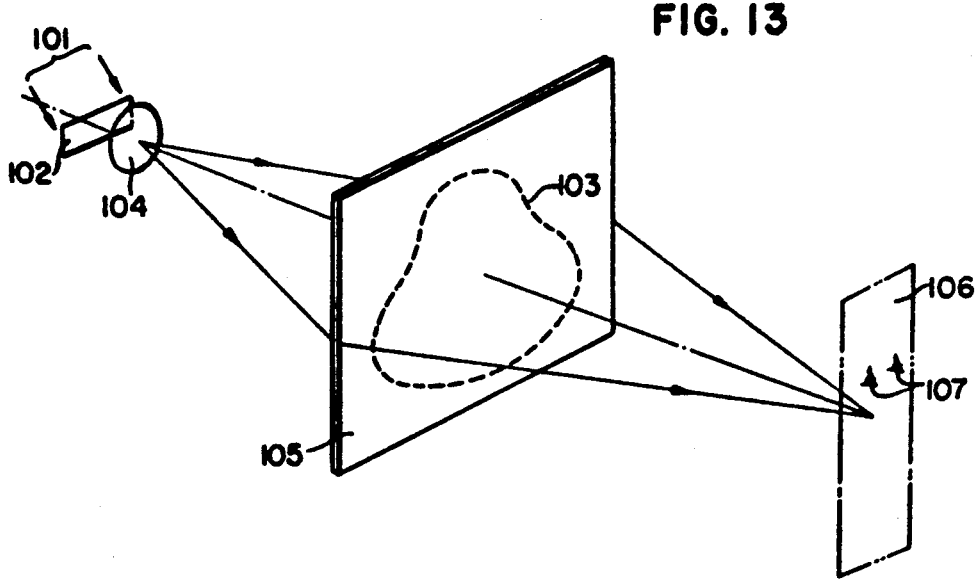
FIG. 13 is a perspective view of another embodiment relating to the present invention.

FIG. 13 illustrates another embodiment of the present invention. Here, a coherent beam 101 strikes a strip-shaped hologram 102 extending along the direction of a viewer's two eyes, namely the lateral direction in the drawing. A projected image 103 of the virtual image reproduced from the hologram is formed by a projection lens 104 upon a transmission type limited directional screen 105. Within a plane 106, a viewer 107 may observe the reconstructed image. During observation, the limited directional screen produces the pupil's image of the projection lens in the form of a longitudinally extending strip 106 at the position conjugate relative to the screen, and corresponding to the characteristics of the screen. By using a projection lens having a fairly large aperture, an extensive area is available for observation, despite use of a comparatively small hologram. An advantage of the invention lies in the fact that the viewer does not feel as though he is looking at objects through a window, because the image is produced on the screen.

While the description has been made relative to the projection of a hologram and same things can be said in case of observation of image reproduced from the synthetic hologram composed of picture elements containing images corresponding to variation in two eyes parallax caused by and photographed by an ordinary camera from different view points.

In addition, holographic stereographic movie pictures are produced by successively projecting the strip-shaped holograms formed corresponding to time variations or with synthetic holograms.

The following embodiment of the present invention is most effective for easy observation of color images.

The hologram having two-dimensional image diffused and illuminated can reproduce an image constantly identical at any fraction thereof. In the foregoing synthetic hologram, parallax informations in one direction (generally in a longitudinal direction) are eliminated (variation of visual points is limited in one direction when the original picture being photographed) and element holograms are arranged in the direction of decreasing stereogram informations so as to correspond to beams having different regenerated wave lengths. The element holograms are illuminated in the same direction with respective beams having corresponding wave length, so that the images reproduced by the corresponding illuminating beams will completely be put together to each other. However, when observing the reproduced images through a hologram, one cannot observe color images, since informations of colors are arranged separately on the plane of the hologram. But when observing the holograms mentioned above through the system according to the present invention, one can easily observe the color image.

Figure 14:
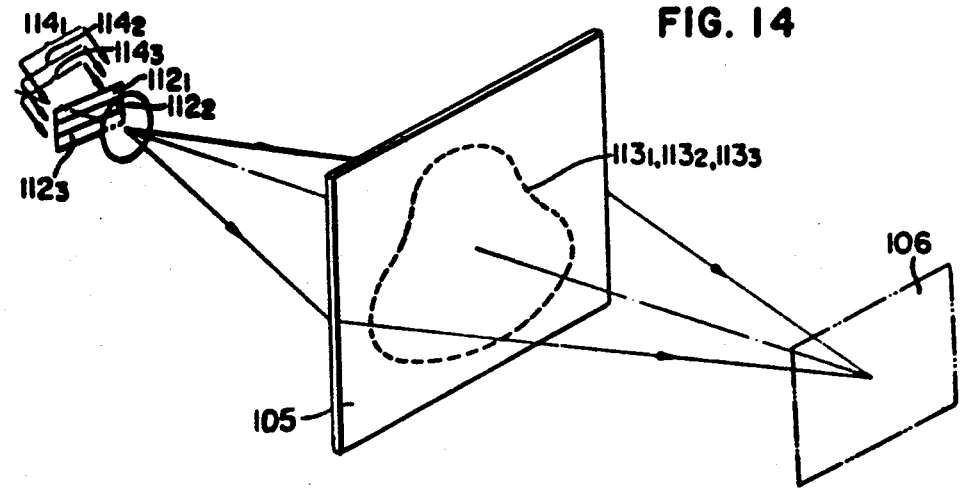
FIG. 14 is a perspective view of an embodiment relating to the present invention different from the one shown in FIG. 13.

As shown in FIG. 14, when projected images 113, ... . of the reproduced virtual image by a plurality of holograms $112_1$, $112_2$ which correspond to beams $114_1$, $114_2$ of different wave lengths coincide on the plane 105 of the limited directional screen, the images have no color slip and informations of each different colors are mixed together with each other in an observation area 106, and thus observation of color image is possible, even though the different color informations are separated on the plane $112_1$, $112_2$ of holograms caused by diffusibility of the screen in one direction (the same direction to the direction of holograms arranged corresponding to each beam of different wave length).

In each of embodiments shown in FIGS. 13 and 14 respectively, it can apparently be understood that an orthoscopic real image can be observed through the transmission type limited directional screen by changing the arrangement of the element holograms.

What is claimed is:

1. A holographic viewer system, comprising a strip shaped elongated holographic element containing three-dimensional information and containing parallax information along the long dimension, means for directing a reconstructing beam onto the holographic element to form an image beam, a screen in the path of the image beam, said screen being constructed so that light incident thereon is diffused in one direction and autocollimated in the other direction, said screen being oriented to diffuse the light on the image beam from the holographic element in the direction transverse to the direction of the parallax information and to autocollimate the light in the image beam in the direction of the parallax information.

2. A holographic viewer system, comprising coherent projecting means for projecting a reconstruction beam, a substantially flat hologram having a short dimension and a long dimension orthoganal thereto in the path of the reconstruction beam for diffracting incident light and forming an image beam containing three-dimensional information, the image beam defining a first direction transverse to the image beam corresponding to the longer dimension and containing parallax information and a second direction corresponding to the shorter dimension, a screen, said screen being constructed so that light incident thereon is spread in one direction and autocollimated in another direction transverse to the one direction, said screen and said hologram and said projecting means being positioned relative to each other to allow projection of at least a portion of the image beam on the screen, said screen being arranged relative to the image beam for being autocollimating in the first direction and for spreading the light rays in the second direction.

3. A system as in claim 2, wherein said screen is larger in the first direction than the short dimension of said hologram and wherein said screen is sufficiently large so that an observer can observe a complete image from a single point despite the shortness of the hologram dimension, and wherein said projecting means projects the hologram image onto substantially the entire screen.

4. A system as in claim 2, wherein said hologram includes a plurality of separate recordings, and said projecting means projects the images successively onto the screen so as to produce a motion picture.

5. A system as in claim 2, further comprising a plurality of additional holograms, all of said holograms having information for producing different color images of the same scene, a plurality of additional projecting means for projecting the images onto the screen so as to form a multicolor image.

6. A system as in claim 2, wherein said hologram is strip-shaped and includes a plurality of images, and said projecting means sequentially projects the images on the hologram onto said screen, and wherein said screen is positioned relative to said projecting means so as to produce a virtual image.

7. A system as in claim 2, wherein said screen includes a first lens portion having a continuous surface extending over the entire screen and a second lens portion forming a plurality of adjacent lenticular members over the extent of the screen.

8. A method for reproducing a three-dimensional image from a hologram element having a short dimension and a long dimensnion and containing three-dimensional information, including parallax information along the long dimension, comprising projecting a reconstructing beam on the element so as to form an image beam, autocollimating the image beam from the hologram element in the direction of the parallax information with a screen while diffusing the light from the screen in the direction orthogonal thereto, and observing the resulting image at the observation plane.

9. The method as in claim 8, wherein the three-dimensional picture element is an elongated hologram in which only information perpendicular to the parallax direction is reduced.

10. The method as in claim 8, wherein the element forms one of a plurality of similar elements arranged transverse to the parallax direction and further comprises the steps of successively illuminating each of the elements as the first element.

11. A system for reproducing three-dimensional images, comprising an element containing three-dimensional information, the information along one dimension being reduced perpendicular to another dimension of the element, the information along the other dimension containing parallax data projecting means for producing a reconstruction beam and forming an image beam defining directions corresponding to the dimensions, a three-dimensional screen located at the image, said screen having means for causing pseudoscopic-to-orthoscopic conversion of the image from the screen in one direction, said screen having diffusing means for diffusing the light from the screen in another direction, said screen being oriented to cause pseudoscopic-to-orthoscopic, conversion of the image from the hologram along the longer dimension and to diffuse light along the shorter dimension, and pseudoscopic-to-orthoscopic conversion means and diffusion means include a lenticular sheet and a diffusion reflection plane on the back of the sheet.

12. A system as in claim 3, wherein the screen is a large concave reflection mirror.

13. A system as in claim 11, wherein the screen is a large concave reflection mirror.

14. A system as in claim 11, wherein said screen includes a large convex screen provided with a lenticular structure on its surface.

15. A three-dimensional image display system for a horizontal strip-shaped hologram, comprising:
a coherent light source for illuminating said hologram, a reflective screen which is autocollimating in the horizontal and effective to spread light in the vertical direction, said source and screen being arranged relative to each other to form a real pseudoscopic three-dimensional image reconstructed from the hologram so that reflected light from the screen is autocollimating in the horizontal direction and spreads light in the vertical direction, and so that an observer in the path of light from the screen can see the three-dimensional image orthoscopically.

16. A system as in claim 15, wherein said screen is a combination of a lenticular sheet and a diffusible reflective surface.

17. A system as in claim 15, wherein said screen is a large concave mirror having irregular parallel grooves.

18. A system as in claim 15, wherein said system includes the hologram and the hologram is a holographic stereogram.

19. A three-dimensional color image display system for a plurality of horizontal strip shaped color component holograms; a plurality of coherent light sources for illuminating each of said holograms, a reflective screen which is autocollimating in horizontal and spreads light in the vertical direction, said source and said screen being arranged relative to each other to form a plurality of real pseudoscopic three-dimensional images reconstructed from the holograms so that light reflected from the screen is autocollimating in the horizontal and spreads in the vertical direction and an observer in the path of the light from the screen can see the three-dimensional color images orthoscopically.

20. A system as in claim 19, wherein said screen is a combination of a lenticular sheet and a diffusing reflective surface.

21. A system as in claim 19, wherein said screen is a large concave mirror having irregular parallel grooves.

22. A system as in claim 19, said system includes said hologram and said hologram is a holographic stereogram.

23. A system as in claim 15, wherein said screen and said hologram are arranged relative to each other so that light rays passing from one to the other substantially retain their relative degrees of divergences and convergences

* * * * *